(12) United States Patent
De Pauw et al.

(10) Patent No.: US 7,840,787 B2
(45) Date of Patent: Nov. 23, 2010

(54) METHOD AND APPARATUS FOR NON-DETERMINISTIC INCREMENTAL PROGRAM REPLAY USING CHECKPOINTS AND SYNDROME TRACKING

(75) Inventors: Wim De Pauw, Scarborough, NY (US); Donald P. Pazel, Montrose, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/125,370

(22) Filed: May 22, 2008

(65) Prior Publication Data

US 2008/0288558 A1 Nov. 20, 2008

Related U.S. Application Data

(63) Continuation of application No. 11/507,166, filed on Aug. 21, 2006, now abandoned.

(51) Int. Cl.
*G06F 9/00* (2006.01)
(52) U.S. Cl. .................................................. 712/227
(58) Field of Classification Search .................. 712/220, 712/228
See application file for complete search history.

(56) References Cited

U.S. PATENT DOCUMENTS 5,838,975 A * 11/1998 Abramson et al. .......... 717/129
6,405,216 B1 6/2002 Minnaert et al.
6,405,326 B1 * 6/2002 Azagury et al. .............. 714/38

(Continued)

FOREIGN PATENT DOCUMENTS

EP 0455946 A2 11/1991

(Continued)

OTHER PUBLICATIONS

Carl Dionne, Marc Feeley, and Jocelyn Desbiens. A taxonomy of distributed debuggers based on execution replay. In Proceedings of the International Conference on Parallel and Distributed Processing Techniques and Applications, Sunnyvale, CA, Aug. 1996.*

(Continued)

*Primary Examiner*—Eddie P Chan
*Assistant Examiner*—Keith Vicary
(74) *Attorney, Agent, or Firm*—Ryan, Mason & Lewis, LLP (57) ABSTRACT

Methods and apparatus are provided for non-deterministic incremental program replay using checkpoints and syndrome tracking. Replay of a program proceeds by, for a given execution of the program, recording one or more checkpoints of the program, the one or more checkpoints containing program state information; and a recorded list of values for one or more identified variables executing in one or more threads of the program. Thereafter, during a replay execution of the program, the process continues by commencing execution from a particular one of the recorded checkpoints; restoring the program state information associated with the particular one of the recorded checkpoints; comparing an observed list of values to the recorded list of values for the one or more identified variables executing in each of the one or more threads; and identifying a difference between the observed list of values and the recorded list of values. A perturbation or suspend statement can optionally be introduced into the replay execution of the program.

20 Claims, 13 Drawing Sheets

U.S. PATENT DOCUMENTS

| | | | |
|---|---|---|---|
| 7,243,262 B2 * | 7/2007 | Mukherjee et al. | 714/15 |
| 7,673,181 B1 * | 3/2010 | Lindo et al. | 714/38 |
| 2005/0177775 A1 * | 8/2005 | Qadeer et al. | 714/38 |
| 2005/0283780 A1 * | 12/2005 | Karp et al. | 718/100 |
| 2008/0127200 A1 * | 5/2008 | Richards et al. | 718/106 |
| 2008/0270770 A1 * | 10/2008 | Vertes et al. | 712/227 |

FOREIGN PATENT DOCUMENTS

EP          455946 A2 *  11/1991

OTHER PUBLICATIONS

Frank Cornelis, Andy Georges, Mark Christiaens, Michiel Ronsse, Tom Ghesquiere, and Koen De Bosschere. A taxonomy of execution replay systems. In Proceedings of International Conference on Advances in Infrastructure for Electronic Business, Education, Science, Medicine, and Mobile Technologies on the Internet, 2003.*

Ronsse, M.A., De Bosschere, K., Chassin de Kergommeaux, J., "Execution Replay and Debugging", Proc. AADEBUG, 2000.*

"Timestamps for programs using messages and shared variables"; Bechini, A. Tai, K.-C. ; This paper appears in: Distributed Computing Systems, 1998. Proceedings. 18th International Conference on Publication Date: May 26-29, 1998 on pp. 266-273.*

Robert H. B. Netzer, "Optimal tracing and replay for debugging message-passing parallel programs" Journal of Supercomputing, 8, 371-388 (1995).*

A debugging tool for software evolution, Abramson, D. Sosic, R. , This paper appears in: Computer-Aided Software Engineering, 1995. Proceedings., Seventh International Workshop on Publication Date: Jul. 10-14, 1995 on pp. 206-214.*

Michiel Ronsse and Koen De Bosschere. Non-Intrusive On-the-Fly Data Race Detection Using Execution Replay. In Fourth International Workshop on Automated Debugging, pp. 148-163, Aug. 2000.*

Adaptive message logging for incremental program replay, Netzer, R.H.B. Jian Xu , This paper appears in: Parallel & Distributed Technology: Systems & Applications, IEEE [see also IEEE Concurrency] Publication Date: Nov. 1993 vol. 1, Issue: 4.*

Bil Lewis, "Debugging Backwards in Time," Proceedings of the Fifth International Workshop on Automated Debugging (AADE-BUG 2003, Ghent Computer Research Repository (Sep. 2003).

Pan et al., "Supporting Reverse Execution of Parallel Programs," Workshop on Parallel & Distributed Debugging, Proceedings of the 1988 ACM SIGPLAN and SIGOPS Workshop on Parallel and Distributed Debugging, Madison, WI, pp. 124-129(1989).

Dionne et al., A Taxonomy of Distributed Debuggers based on Execution Replay. In Proceedings of the International Conference on Parallel and Distributed Processing Techniques and Applications, Sunnyvale, CA, Aug. 1996.

Cornelis et al., A Taxonomy of Execution Replay Systems. In Proceedings of International Conference on Advances in Infrastructure for Electronic Business, Education, Science, Medicine, and Mobile Technologies on the Internet, 2003.

Ronsse et al., Execution Replay and Debugging, Proc. AADEBUG, 2000.

Benchini et al., Timestamps for Programs Using Messages and Shared Variables, this paper appears in: Distributed Computing Systems, 1998. Proceedings. 18th International Conference on Publication Date: May 26-29, 1998, on pp. 266-273.

Netzer et al., Optimal Tracing and Replay for Debugging Shared Memory Parallel Programs, Proc. of ACM/ONR Workshop on Parallel and Distributed Debugging, Sigplan Notices 28(12), pp. 111, Dec. 1993.

Abramson et al., A Debugging Tool for Software Evolution, this paper appears in: Computer-Aided Software Engineering, 1995. Proceedings., Seventh International Workshop on Publication Date: Jul. 10-14, 1995, on pp. 206-214.

Ronsse et al., Non-Intrusive On-the-Fly Data Race Detection Using Execution Replay. In Fourth International Workshop on Automated Debugging, pp. 148-163, Aug. 2000.

Jian Xu, Adaptive Message Logging for Incremental Program Replay, Netzer, R.H.B., This paper appears in: Parallel & Distributed Technology: Systems & Applications, IEEE [see also IEEE Concurrency] Publication Date: Nov. 1993, vol. 1, Issue: 4.

* cited by examiner

FIG. 13

METHOD AND APPARATUS FOR NON-DETERMINISTIC INCREMENTAL PROGRAM REPLAY USING CHECKPOINTS AND SYNDROME TRACKING

CROSS-REFERENCE TO RELATED APPLICATIONS

This application is a continuation of U.S. patent application Ser. No. 11/507,166, filed Aug. 21, 2006 now abandoned, incorporated by reference herein.

FIELD OF INVENTION

The present invention relates generally to software application programming, and more particularly, to techniques for program replay under non-deterministic conditions.

BACKGROUND DESCRIPTION

The amount of program development time spent on debugging is a well-known problem that is further exacerbated by increasing software complexity. In part, this complexity derives from the use of new software technologies, including more sophisticated programming paradigms, and the increasing use of available components or libraries, and increasing use of distributed computing. Furthermore, multi-threaded computing is becoming more pervasive due to several factors, including: (i) application requirements for multi-tasking, especially to compensate for computing time lost during transaction waits; (ii) the increasing availability of multi-core computers, whose key feature is the leverage of threads to improve computing performance; and general increased software complexity with component usage which may itself impose threading on new or existing applications.

From a debugging viewpoint, these complex combinations of factors increase the difficulty of locating program defects. However, amongst those factors, non-determinism poses the greatest challenge. Non-determinism constitutes a set of influencing factors, usually external to an application, that make reproducibility of a run difficult. Such factors include data non-determinism, such as clock readings, or database updates spanning various runs. Non-determinism due to timing is another major inhibitor to reproducibility. Timing factors include thread scheduling, or interception of events, such as I/O events or human interaction events. Thread schedule timing is heavily influenced by the current system load, or computing resource availability. All of these factors are particularly difficult to manage, in view of reproducing a computer application execution that could reveal a critical programming flaw.

A need therefore exists for methods and apparatus for dealing with non-determinism for program replay, addressing the issues presented by the above-mentioned factors. Yet another need exists for methods and apparatus that facilitate application replay, accounting for non-determinism. A further need exists for methods and apparatus for non-deterministic incremental program replay using checkpoints and syndrome tracking.

SUMMARY OF THE INVENTION

Generally, methods and apparatus are provided for non-deterministic incremental program replay using checkpoints and syndrome tracking. According to one aspect of the invention, replay of a program proceeds by, for a given execution of the program, recording one or more checkpoints of the program, the one or more checkpoints containing program state information; and a recorded list of values for one or more identified variables executing in one or more threads of the program. Thereafter during a replay execution of the program, the process continues by commencing execution from a particular one of the recorded checkpoints; restoring the program state information associated with the particular one of the recorded checkpoints; comparing an observed list of values to the recorded list of values for the one or more identified variables executing in each of the one or more threads; and identifying a difference between the observed list of values and the recorded list of values.

The observed list of values can comprise, for example, before and after values for each value change for each of the one or more identified variables. The observed list of values can be stored as an ordered list of value changes for each of the one or more identified variables executing in the one or more threads of the program. The recorded list of values for the one or more identified variables can be obtained for a determined set of recorded threads of the program and wherein the replay execution of the program comprises replaying the determined set of recorded threads. The comparing step can be performed for each of the threads for each value change to compare before and after values for each value change.

According to a further aspect of the invention, a perturbation or suspend statement can be introduced into the replay execution of the program. In another aspect of the invention, where a plurality of threads in the program are interdependent, the plurality of inter-dependent threads are partitioned into a partition and the program threads in each of the partitions are replayed separately until a successful execution.

A more complete understanding of the present invention, as well as further features and advantages of the present invention, will be obtained by reference to the following detailed description and drawings.

DETAILED DESCRIPTION

The present invention provides methods and apparatus for application execution replay. In particular, the present invention provides methods and apparatus for non-deterministic incremental program replay using checkpoints and syndrome tracking. The present invention may be employed for program debugging or program replay. More particularly the present invention may be employed to recreate a program execution for debugging, and even more particularly to recreate debug executions influenced by non-determinism, for example, due to thread scheduling and influences of computer systems loads.

According to one aspect of the invention, data values of a selected set of data variables in an application are recorded for a specified set of threads, at various points in each thread. A recording of the values of these data states is made during a primary run. Secondary runs of the application are made wherein for the corresponding threads, the data values for data variables, at specified program execution locations, are compared to the values recorded in the primary run. If a valiance in values is detected, an event is emitted requesting further action. In some embodiments, for example, response to this event includes program re-execution. Again in some embodiments, for example, response to this event may be the halting of the execution by a debugger controlling the application for further exploration.

According to another aspect of the invention, the state recording mentioned above occurs between application checkpoints that provide sufficient information to restart an application at various points of execution. This facilitates the use of this invention for long-running and complex applications, in that when the detection event is emitted, replay can re-commence from a prior checkpoint.

According to another aspect of the invention, for any thread recording, the threads may be partitioned into execution groups whose executions are independent of each other, as determined by the application's design. In this aspect, the replay may proceed by running each group separately from others. In this manner, the replay is more granular, allowing potentially faster replay.

Perturbation threads can be instantiated that could impose further non-determinism on the application, thereby increasing the likelihood of uncovering further application defects.

Figure 1:
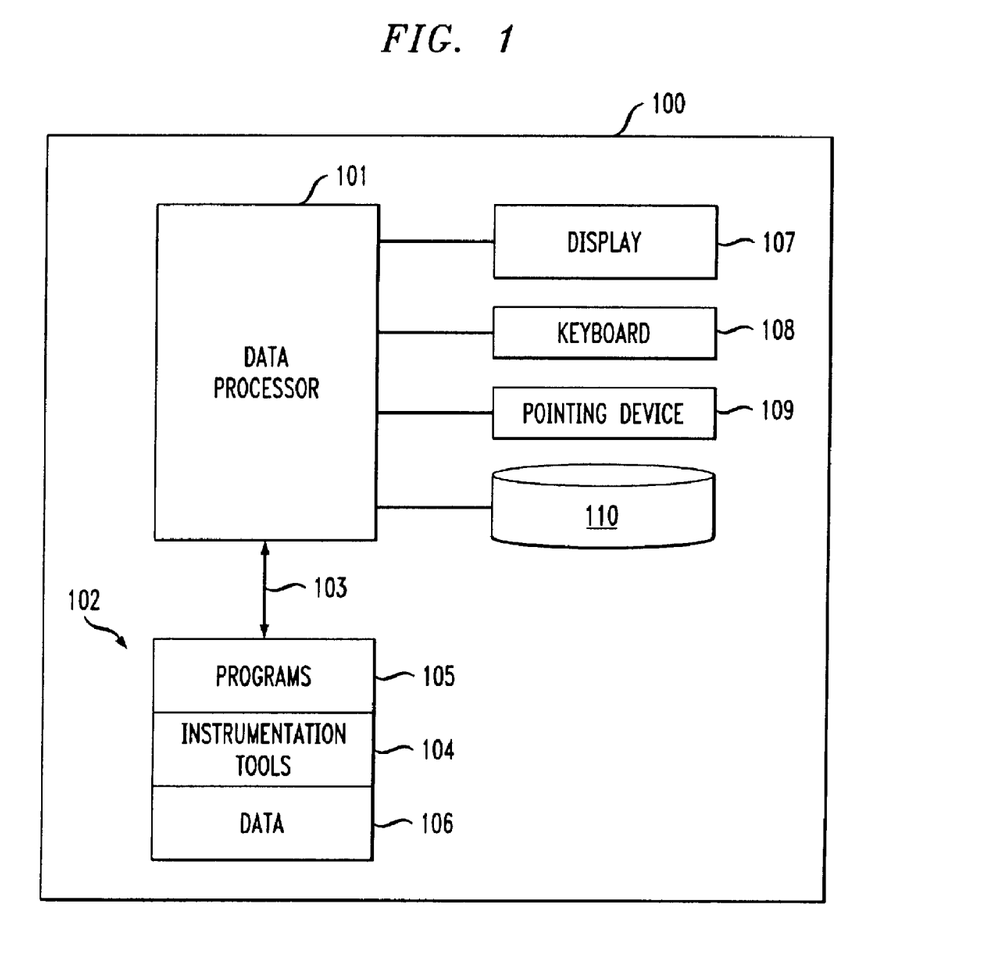
FIG. 1 is a block diagram illustrating a data processing system in which the present invention can operate.

Referring now to the drawings, and more particularly to FIG. 1, there is shown a block diagram of a data processing system 100 for application replay of the present invention, as described above. In preferred embodiments, the data processing system 100 is an IBM Intellistation computer (IBM and Intellistation are both registered trademarks of the International Business Machines Corporation). However, other data processing systems 100 are also contemplated for use by the present invention. For example, the invention can be implemented using a plurality of separate electronic circuits or devices (e.g., hardwired electronic or logic circuits, or programmable logic devices such as PLDs, PLAs, PALs, or the like). A suitable programmed general, purpose computer, e.g., a microprocessor, microcontroller or other processor device (CPU or MPU), either alone or in conjunction with one or more peripherals (e.g. integrated circuit) data and signal processing devices can be used to implement the invention. In general, any device or assembly of devices on which a finite state machine capable of implementing the flow charts shown in the following figures can be used as a controller with the invention.

FIG. 1 is a block diagram illustrating an exemplary data processing system 100 in which the present invention can operate. As shown in FIG. 1, the exemplary data processing system 100 comprises a data processor 101 and a memory 102. The memory 102 is coupled to the data processor 101 via a bidirectional bus 103. The memory 102 typically includes program and data memory. The exemplary memory 102 also includes application program instrumentation and replay tools 104 in accordance with the present invention. The memory 102 may also contain one or more application programs 105 that will be used by the instrumentation and replay tools 104. The memory 102 also contains data memory 106; specifically, data or data objects related to replay execution of the programs 104.

The processing system 100 optionally presents information to the user on display 107, which is coupled to the data processor 101. A user data entry device 108 (e.g., a keyboard or another interactive device) and a pointing device 109, for example, a mouse or a trackball, are also optionally coupled to the data processor 101.

The display 107 can provide a presentation space for the IDE (Integrated Development Environment) in order to display information related to the program replay. In further embodiments, either the pointing device 109 or predefined keys of the data entry device 108 may be used to manipulate the data in conformity with aspects of the present invention.

It is also contemplated that a persistent storage mechanism 110 may exist and be utilized to store application programs 105 and data 106. This type of storage media may include, but is not limited to, standard disk drive technology, tape, or flash memory. The program information 106 may be both stored onto the persistent media, and/or retrieved by similar processing system 100 for execution.

Figure 2:
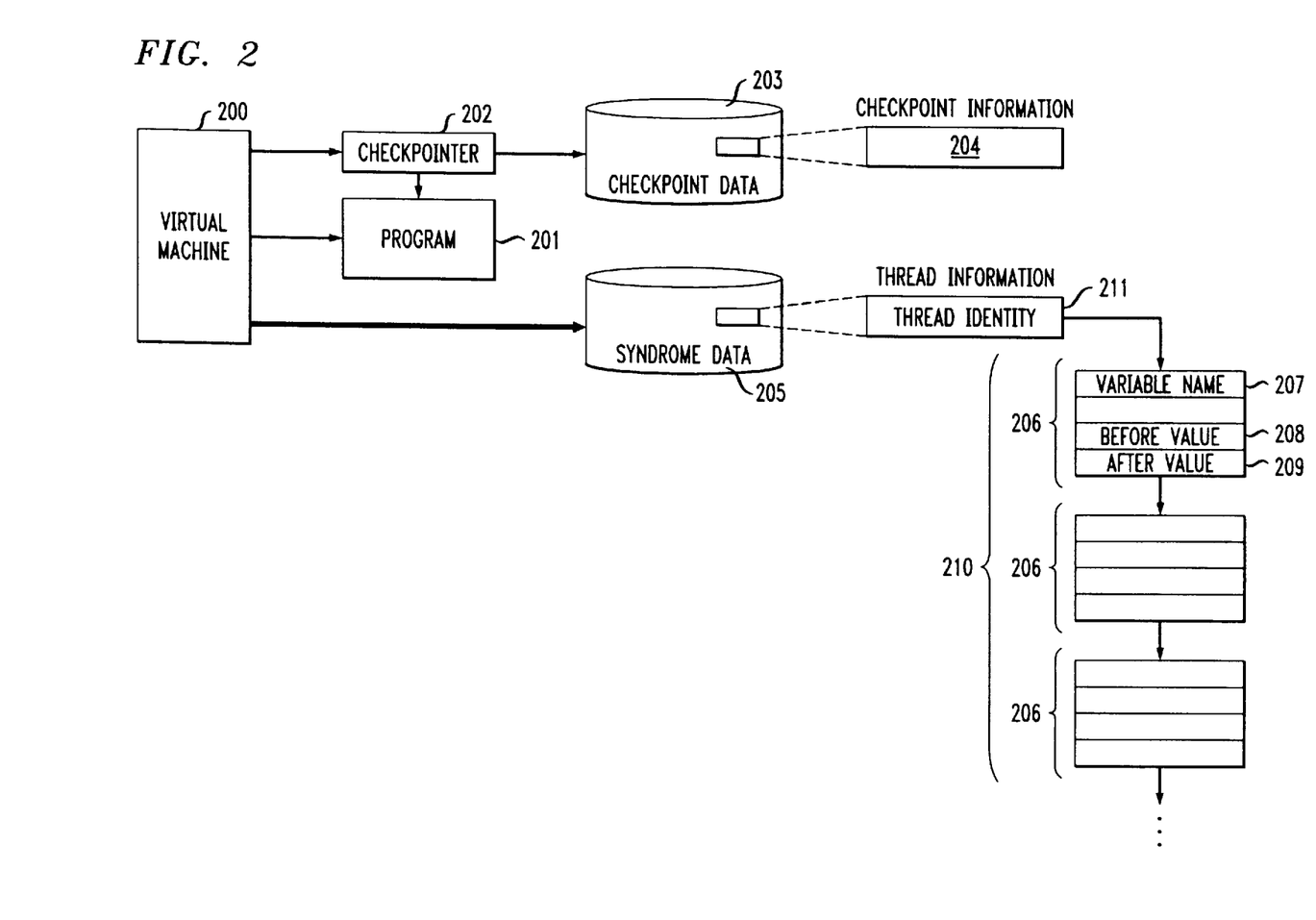
FIG. 2 illustrates the software and data components associated with the present invention.

FIG. 2 illustrates the software and data components associated with the present invention. As shown in FIG. 2, a virtual machine 200 controls and interacts with the program 201 of interest to be replayed. The virtual machine 200 embodies both instrumentation and replay features of the present invention, and may be embodied using a program virtual machine such as a Java virtual machine incorporating a program debugger, supporting execution libraries for the program 201, or similar, as modified herein to incorporate the features and functions of the present invention. The virtual machine 200 acts both as an agent to facilitate the instrumentation of the program 201, and control the replay of it.

FIG. 2 also illustrates a checkpoint and restore mechanism 202 that records the values of program data from program 201 during its execution, based on predefined criteria. These data recordings are held in data storage 203 as checkpoint records 204. The mechanism 202 is also capable of restoring program state to program 201 sufficient for program 201 to continue execution. Application checkpoint and restore mechanisms are well known and described in the computer science literature, and are not further discussed in detail, except for its use by virtual machine 200 in support of the present invention.

Again referring to FIG. 2, the virtual machine 200 managing the instrumentation and replay of program 201, produces replay (syndrome) data 205 from instrumentation of program 201 for execution replay. Syndrome data 205 consists of records 206, each identifying a variable 207 with "before value" setting 208, and "after value" setting 209. Records 206 are kept as an ordered list 210 relative to record 211 detailing before values 208 and after values 209 for variables 207, identifying an execution thread 211 recorded during instrumentation execution of program 201.

Figure 3:
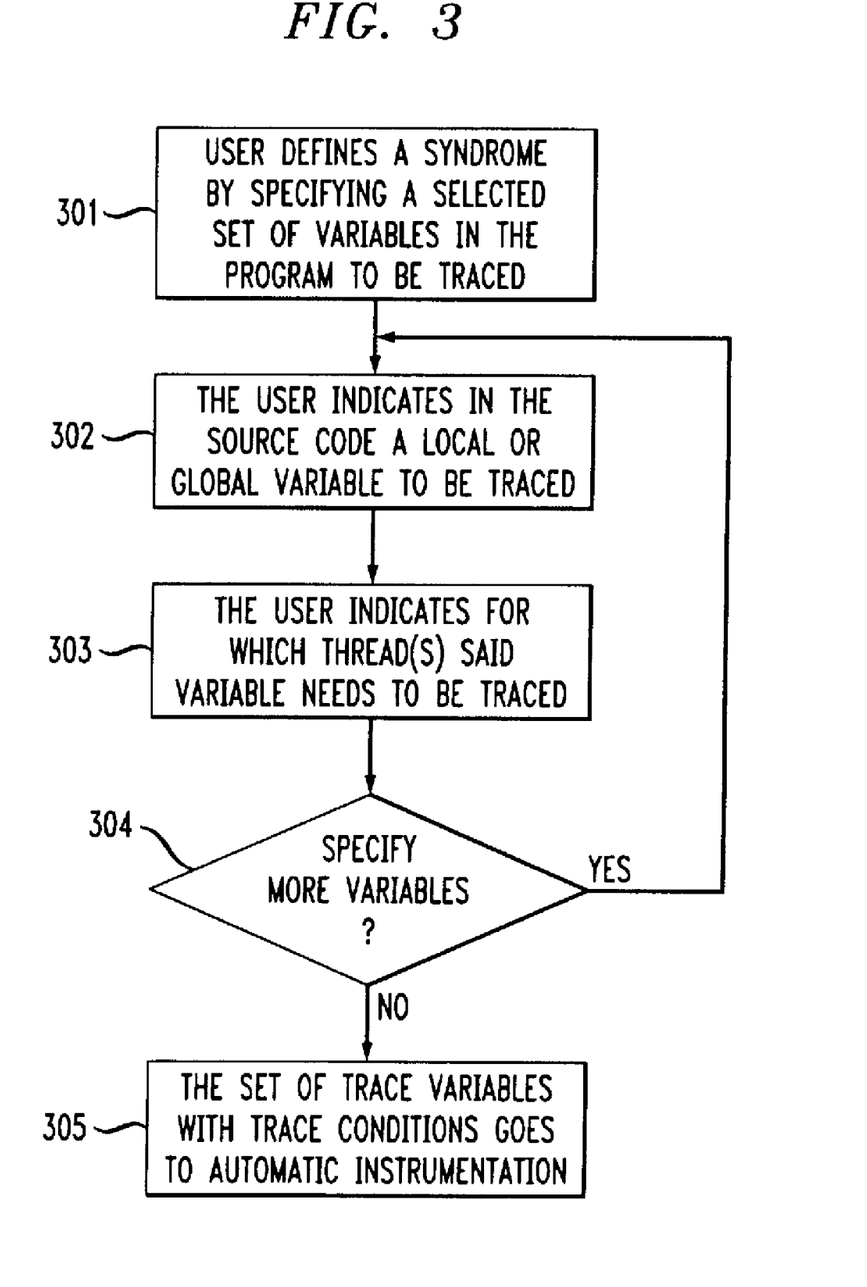
FIG. 3 is a flow chart illustrating an exemplary technique for setting the instrumentation data for the replay mechanism.

FIG. 3 is a flow chart illustrating an exemplary technique for setting the instrumentation data for the replay mechanism. As used herein, the instrumentation data for a replay is called a syndrome, and consists of a set of local or global variables in a program. In other embodiments, the instrumentation data may contain other program artifacts, such as data structures and objects, provided said data can be instrumented for capturing value settings, as will be discussed further below. As a first step, the syndrome is defined (301). A local or global variable is then selected (302), along with the identity of the thread that the instrumentation applies to (303), and specifies this to the instrumentation mechanism. A check is made for more variables (304), which, if true, returns to step 302, or, otherwise, the set of specified variables and associated threads are sent to instrumentation (305).

Figure 4:
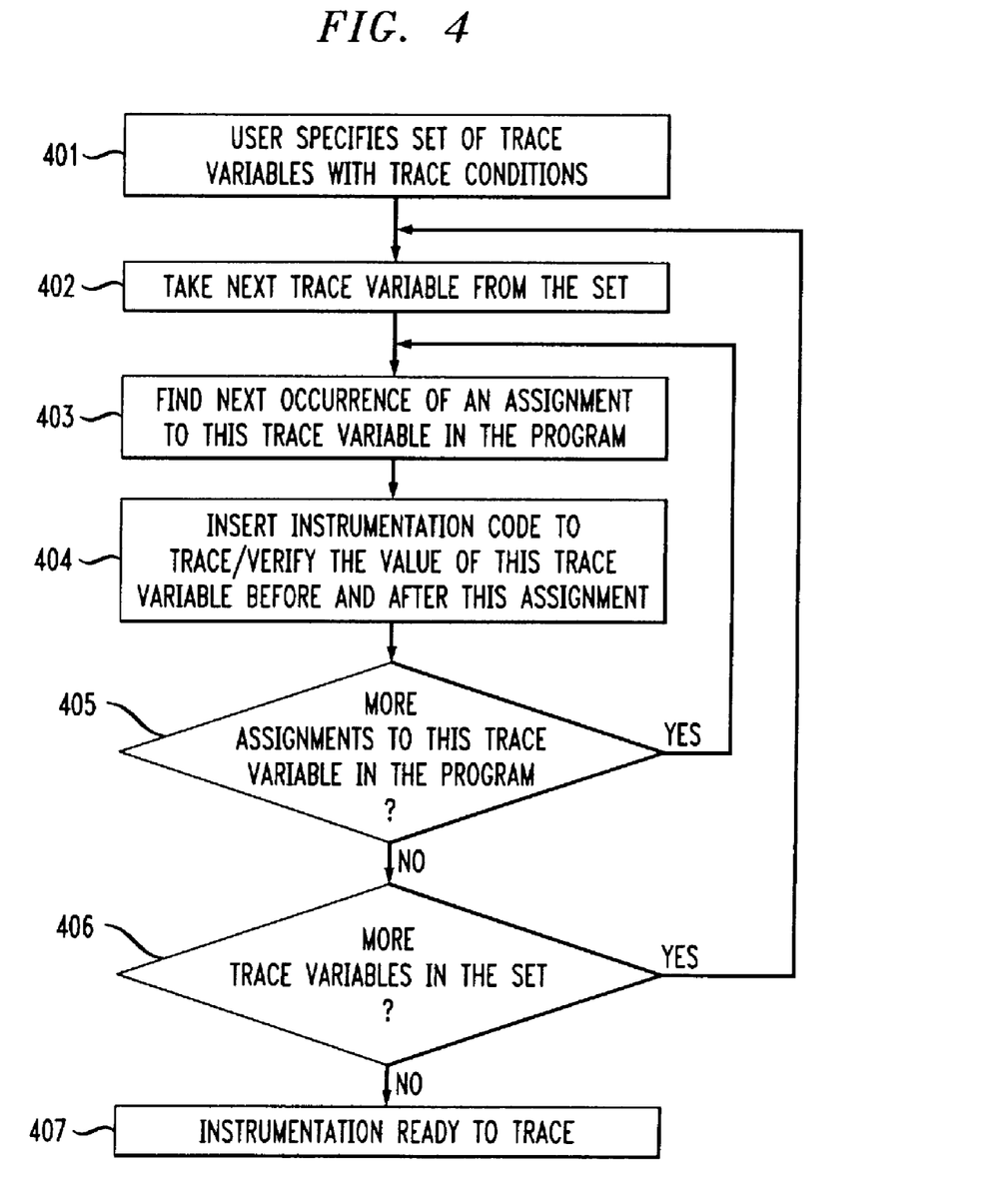
FIG. 4 is a flow chart describing an exemplary process for instrumentation of a program for tracing based on specified local and global variables and threads.

FIG. 4 is a flow chart describing an exemplary process for instrumentation of a program for tracing based on specified local and global variables and threads. After the user has determined the set of local and global variables and threads (401), a member of said information is selected (402). A location of an assignment to said variable is selected (403). Location of said assignment can be done in a variety of ways, including human visual inspection, or automated program analysis tools. It is not necessary to the present invention for all such assignments to be determined or instrumented. With location of said assignment statement, the program may be instrumented to record its value both before and after its setting (404). Instrumentation may be achieved in several ways, including debugger programmable breakpoints or automated code modification to insert data value recording. After a check is made to see if more assignments for said variables exist and are desired to be traced (405), a further selection of assignment statement is made by passing control passing back to step 403. Otherwise, if no further assignments are to be considered at 405, a check is made to see if more local and global variables require instrumentation (406), and if so, one is chosen with a return to step 402. Otherwise, control proceeds to tracing the program (407). In the logic presented in FIG. 4, it is assumed that the lists of variables, and associated assignment statement lists are all non-empty. In cases wherein one or more of such lists are empty, various exits from the logic would be inserted, as would be apparent to one skilled in the art of programming.

Figure 5:
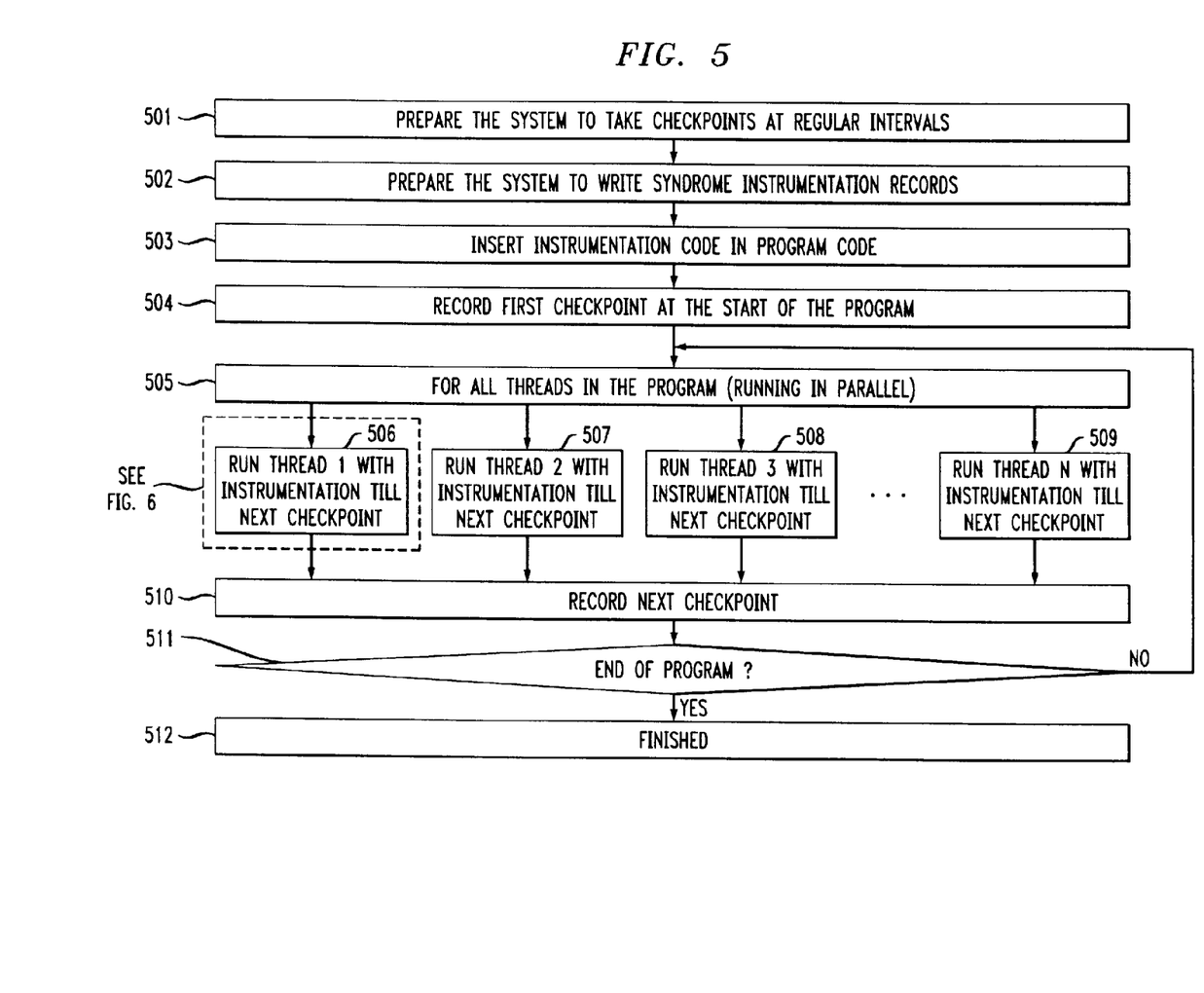
FIG. 5 is a flow chart depicting an exemplary tracing or recording process.

FIG. 5 is a flow chart depicting an exemplary tracing or recording process. The process first prepares the application program to produce checkpoints (501), at regular intervals or at execution points as determined by the practitioner. Similarly, the process prepares to write syndrome instrumentation records (502) based on instrumentation information produced in the process of FIG. 3. The instrumentation is inserted into the program (503), as described in FIG. 4.

FIG. 5 then proceeds by recording the first checkpoint at the start of the program (504). In the context of all the currently running execution threads (505), each thread executes instrumented code, with 506 being an exemplary instance of such execution 507, 508, and 509 are similar instances of the exemplary 506 instance. At such time as determined to checkpoint, the system records a checkpoint of the application execution (510). A check is made to determine if the program has ended (511). If not, the current set of instrumented threads is run (505). Otherwise, the recording phase is completed (512).

Figure 6:
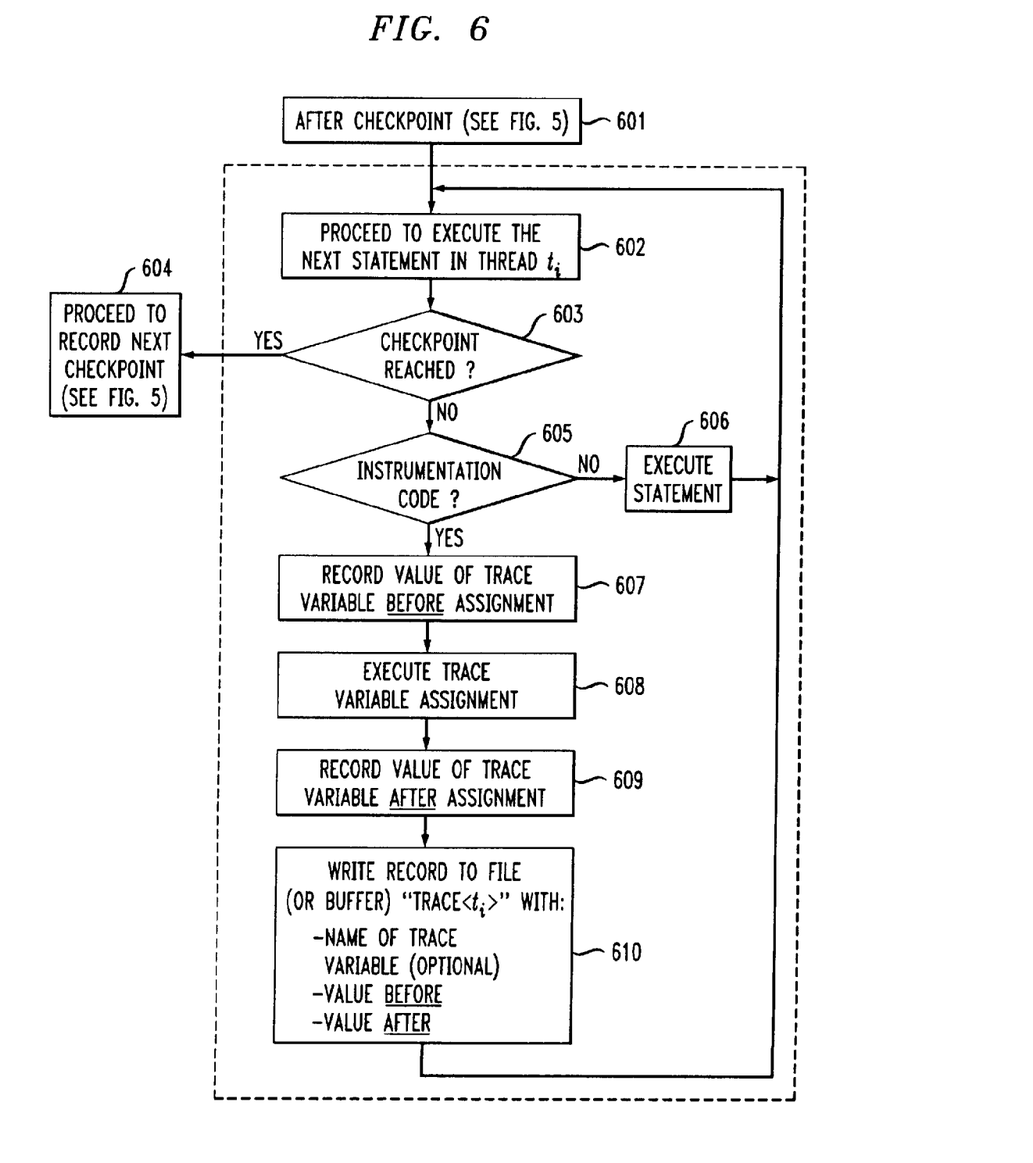
FIG. 6 is a flow chart describing an exemplary process for an instance of instrumented code execution of FIG. 5.

FIG. 6 is a flow chart describing an exemplary process fbi an instance of instrumented code execution 506. Proceeding after checkpoint (601), the next statement for execution is determined (602). A test is made to see if the checkpoint has been reached (603). If so, the process proceeds to record the next checkpoint (604). Otherwise, a check is made to determine if the statement is instrumented (605). If it is not instrumented, the statement is executed (606), and control returns to step 602 to retrieve the next statement. Otherwise, the process records the "before value" of the variable (607), executes the statement (608), and stores the "after value" of the variable (609). This record of information is written to the trace, by means of, for example, a file, memory buffer, database, or another suitable write medium (610). Control then returns to acquiring the next statement (602).

Figure 7:
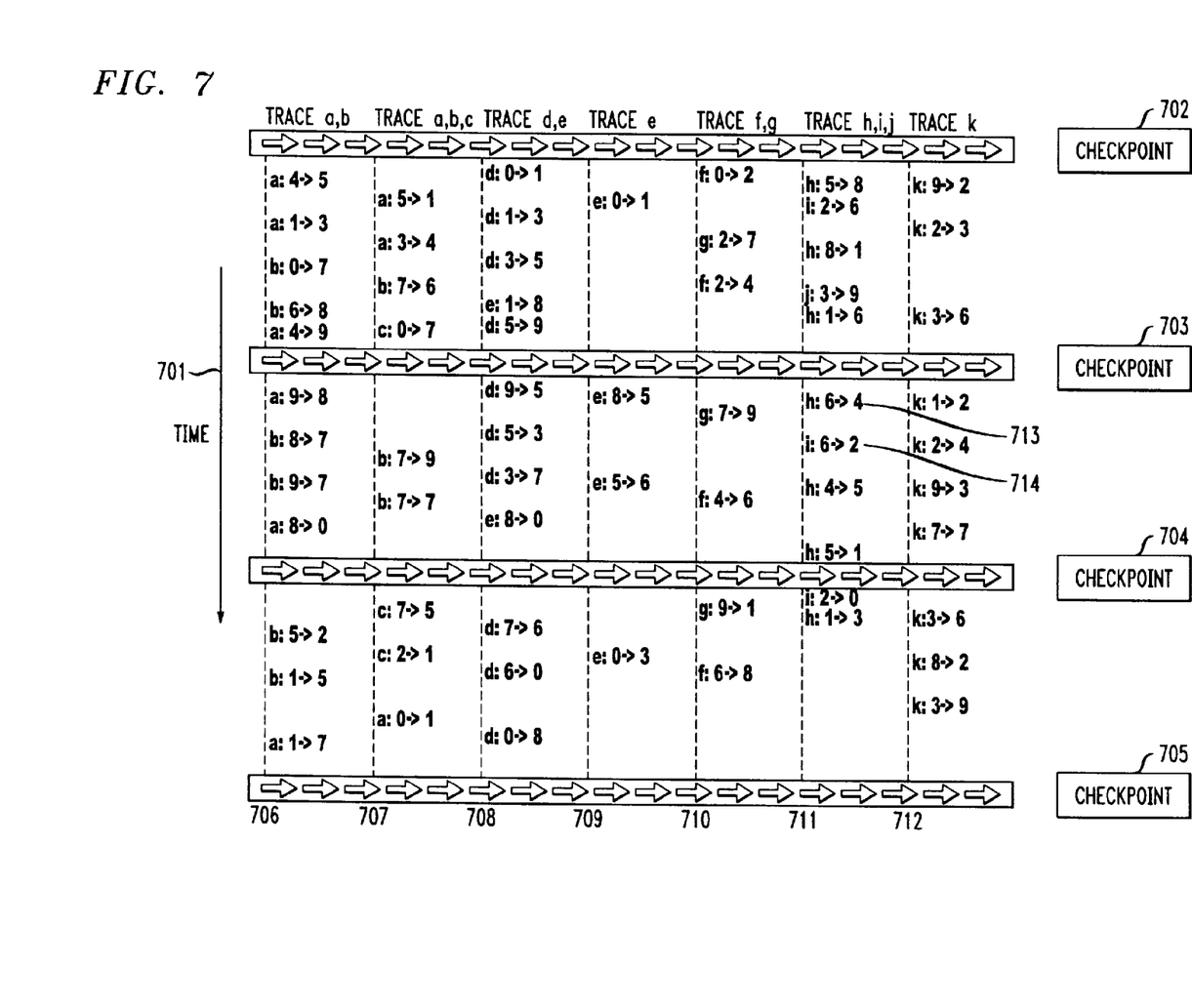
FIG. 7 illustrates the execution of the recording phase.

FIG. 7 illustrates the execution of the recording phase as presented above. FIG. 7 displays the execution of a program depicting time flowing from top to bottom 701. Left to right are shown with different threads of the program listed as traces 706, 707, 708, 709, 710, 711, and 712. There are shown four exemplary checkpoints during this execution, 702, 703, 704, and 705. With each thread, there is shown the execution of instrumentation of a syndrome of variables. For example, 713 shows the recording of trace 711 after the second checkpoint 703, with the recording of a change to variable h, with before value 6 and after value 4. Similarly, 714 shows the variable i changing from 6 to 2. In one exemplary embodiment, the changes in variable values are maintained in an ordered list. In a further variation, a time-stamp can be recorded for each variable change.

Figure 8:
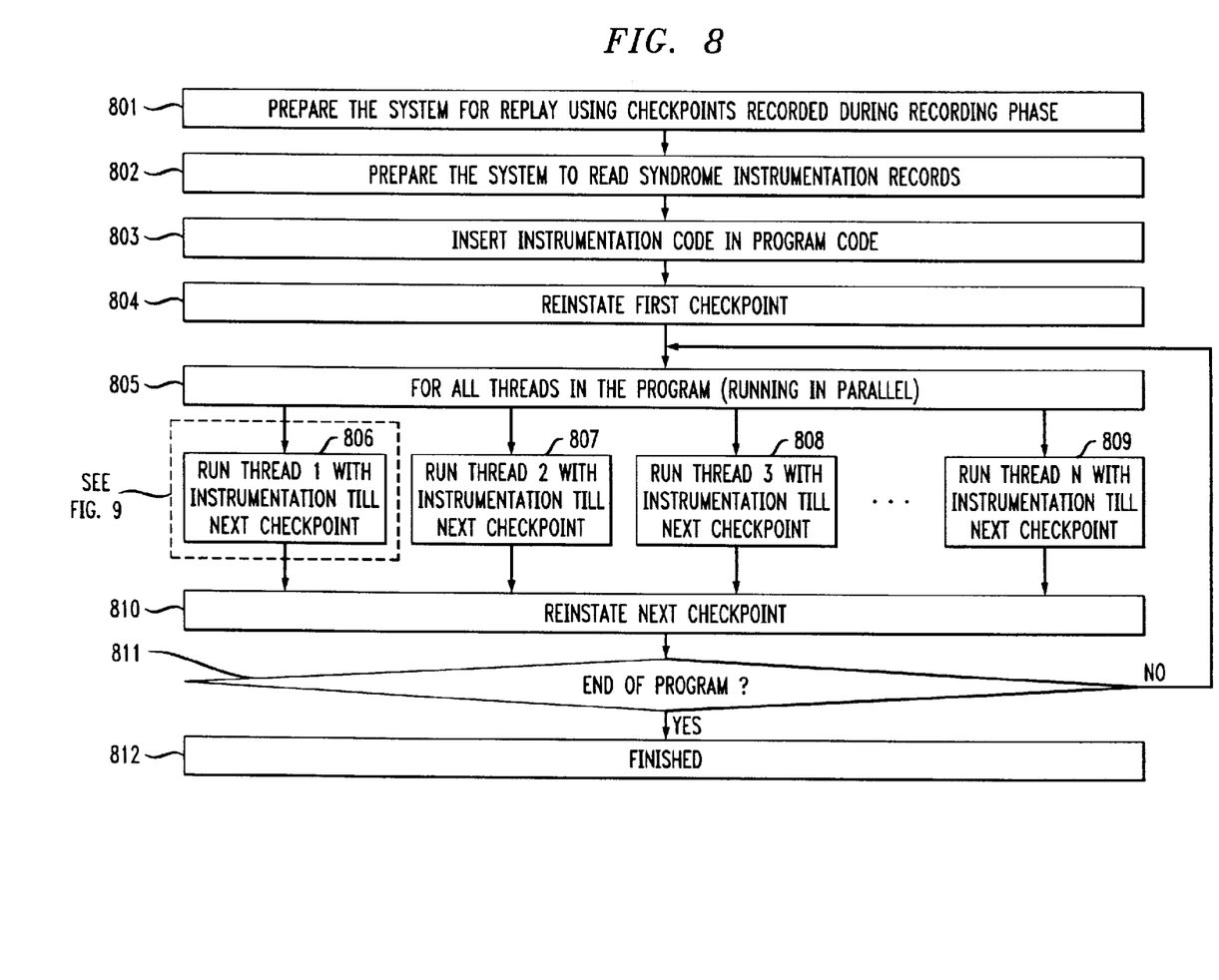
FIG. 8 is a flow chart illustrating an exemplary replay process phase incorporating features of the present invention.

FIG. 8 is a flow chart illustrating an exemplary replay process phase incorporating features of the present invention. The system is prepared for replay using the checkpoints recorded during the recording phase (801). The system is also prepared to read syndrome instrumentation records recorded during the recording phase (802). The program has appropriate instrumentation inserted (803), in a manner similar to the process described in conjunction with FIG. 4. Although inserted in a similar manner, the logic for this instrumentation is different, pertaining to replay as opposed to tracing. The first checkpoint is reinstated (804). In the context of all the threads running in the program (in parallel) (805), with syndrome trace information matched to the appropriate thread, each thread runs the replay instrumentation until the next checkpoint, with thread execution 806 being exemplary. Instrumented thread executions 807, 808, and 809 are similar instances of the exemplary 806 instance. At such time as determined to reinstate the next checkpoint, the system reinstates the next checkpoint of the application execution (810). A check if made to determine if the program has ended (811). If not, the current set of instrumented threads is run (805). Otherwise, the replay phase is completed (812).

Figure 9:
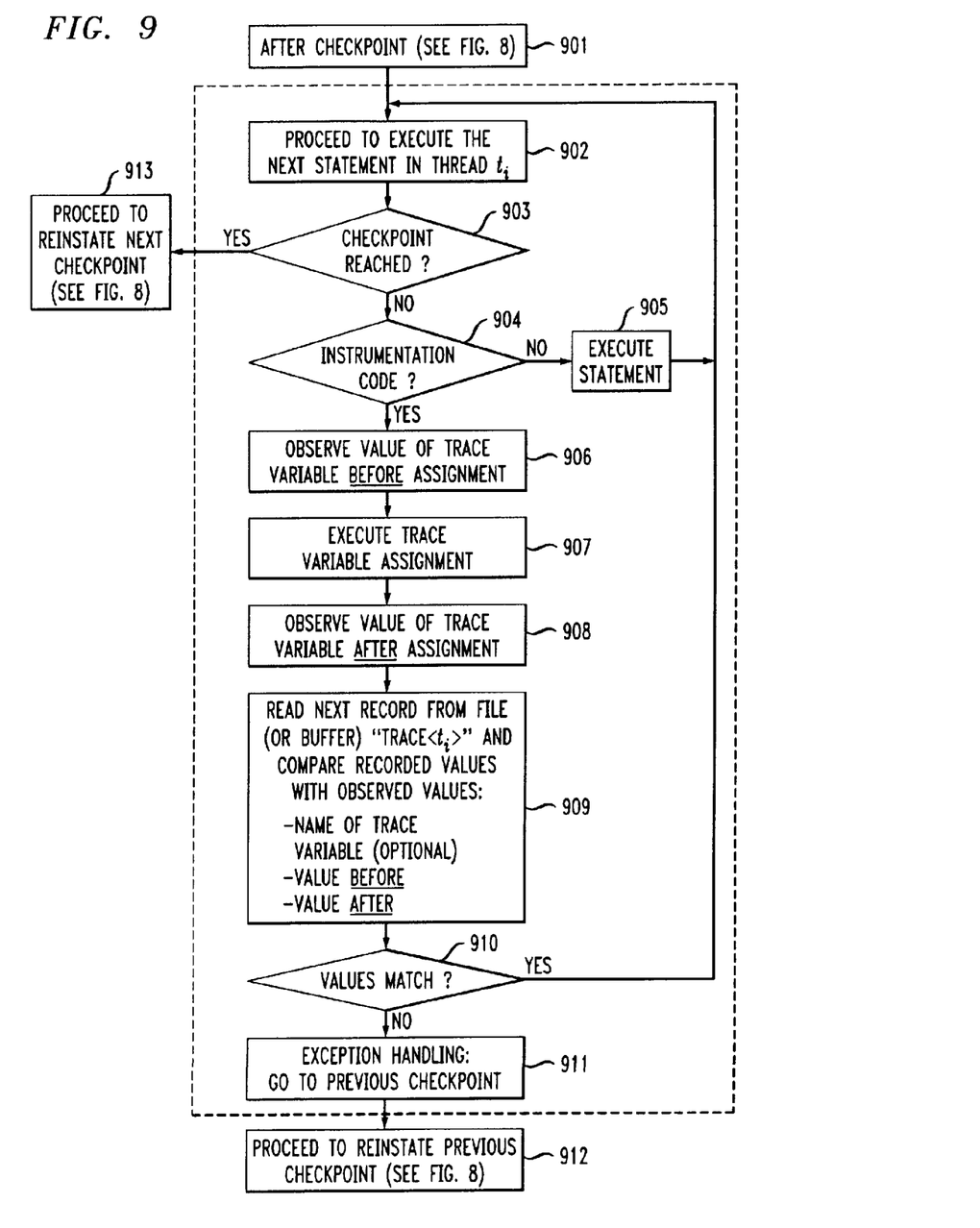
FIG. 9 is a flow chart describing exemplary process details of an exemplary instance of instrumented code execution from FIG. 8.

FIG. 9 is a flow chart describing exemplary process details of an exemplary instance of instrumented code execution (806) from FIG. 8. Proceeding after the checkpoint (901), the next statement for execution is determined (902). A test is made to see if the checkpoint has been reached (903). If so, the process proceeds to reinstate the next checkpoint (913). Otherwise, a check is made to determine if this is instrumented code (904) that was selected by the user to be executed in the current thread $t_i$ as defined in 303 (FIG. 3). If it is not, the statement is executed (905), with control returning to step 902 to access the next statement. Otherwise, the before assignment value of the trace variable is obtained (906), the statement executed (907), and the after assignment value obtained (908). The next trace record is obtained from a trace input stream (909). A check is made if the before/after values just obtained match the before/after values from the trace (910). If any of the before or after values do not match, or if the name of the trace variable is different from the current variable, an exception is thrown (911), and the process proceeds to reinstating the previous checkpoint (912). Otherwise, the process proceeds to step 902 to access the next instruction.

Figure 10:
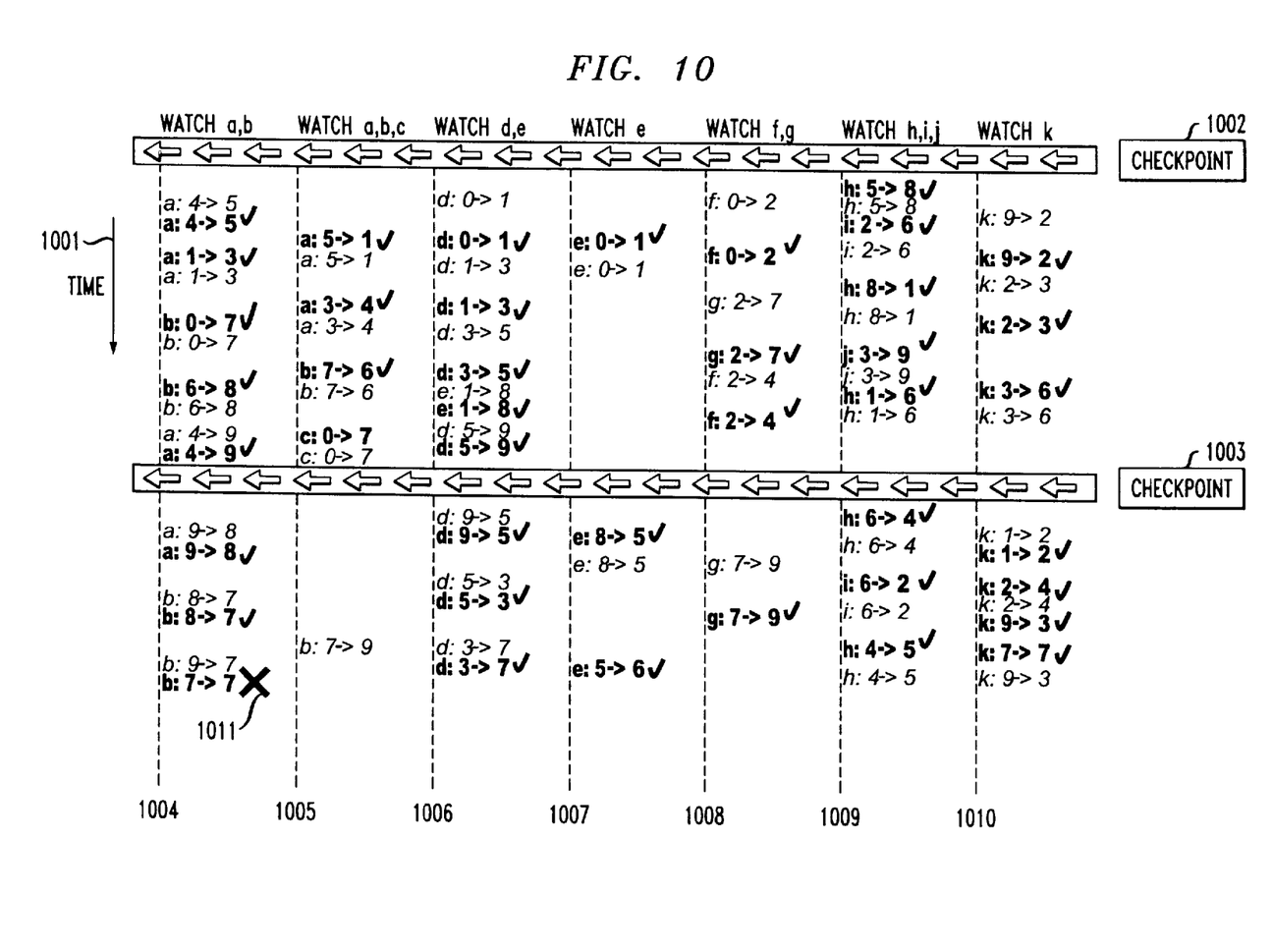
FIG. 10 illustrates the replay process of the present invention.

FIG. 10 illustrates the replay process of the present invention FIG. 10 displays the execution of a program depicting time flowing from top to bottom (1001). Left to right are shown different threads of the program listed as traces 1004, 1005, 1006, 1007, 1008, 1009, and 1010. There are shown two checkpoints during this execution, 1002 and 1003. A replay can be initiated from any checkpoint. As shown in FIG. 10, between checkpoints 1002 and 1003 all observed values (shown in boldface text) are matched to the previously recorded values (shown in regular text) and execution proceeds. Generally, an exemplary embodiment of the present invention is verifying that the same variable transitions occur, in the same order, for each thread and between each checkpoint. After checkpoint 1003, a mismatch is found at point 1011, whereupon an exception is thrown and checkpoint 1003 is reinstated. Generally, following a mismatch, program replay returns to the previous checkpoint.

A mismatch 1011 is an indicator of non-determinism. Upon detecting a mismatch, a debugging tool can optionally be initiated to fix or understand the change in value between the observed and recorded executions. Alternatively, the replay can be restarted at the previous successful checkpoint, until a successful execution is completed. Generally, the present invention allows a user to reach a critical point in program execution for further analysis (bypassing intermediate discrepancies). It is noted that all threads should successfully execute between each checkpoint, before proceeding beyond the next checkpoint.

Figure 11:
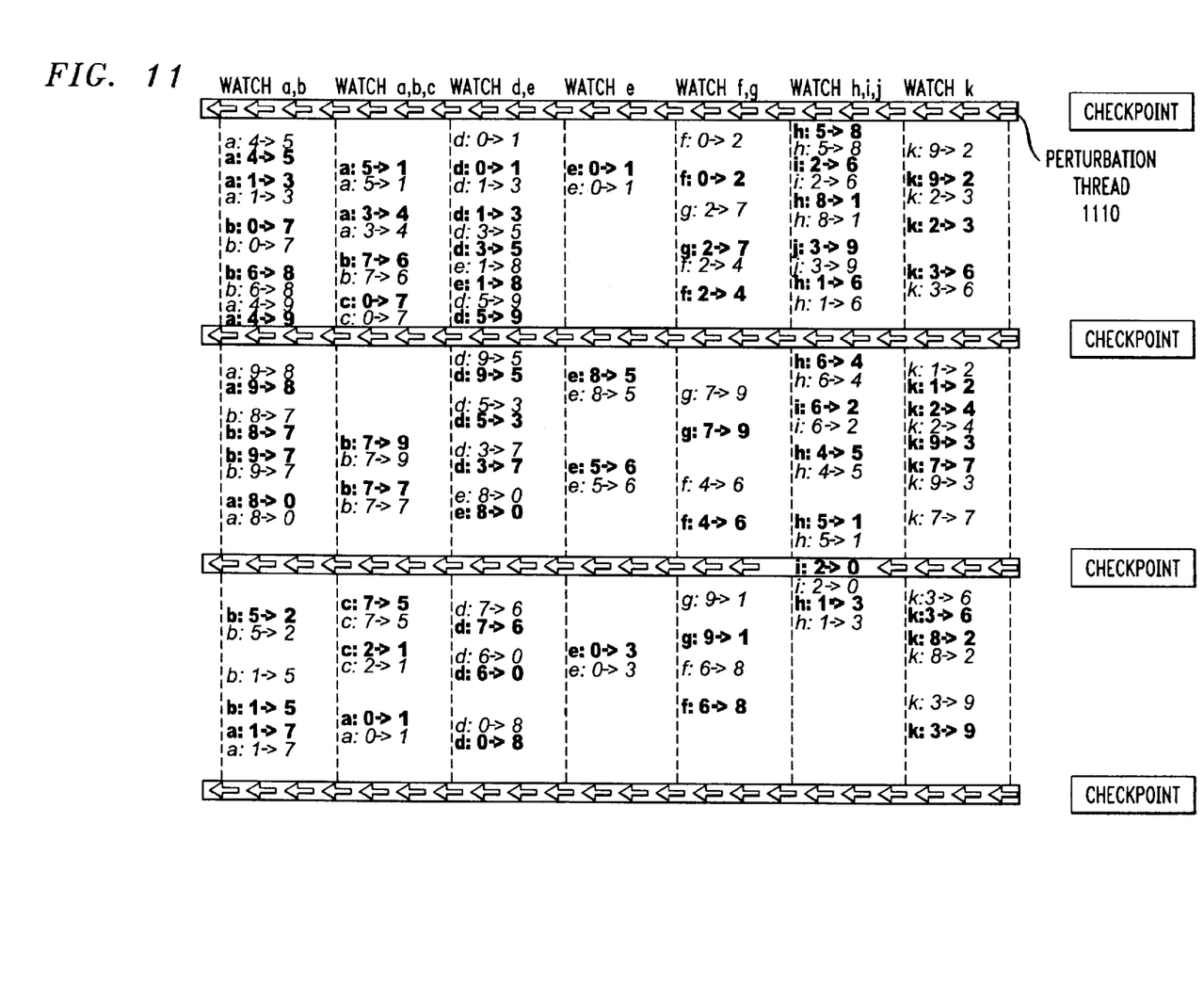
FIG. 11 illustrates a replay process according to a perturbation thread embodiment of the present invention.

FIG. 11 illustrates a replay process according to a perturbation thread embodiment of the present invention. In order to introduce "variability" or non-determinism into a replay execution, and potentially arrive at an expected run, a user can optionally create one or more "perturbation" threads 1110 that affect resource allocation. For example, a user can perform one or mote memory allocations. I/O or network bandwidth functions to simulate external factors that may influence a replay execution may also be added to impose non-determinism. Thus, the replay execution being observed must wait for these functions executed during the "perturbation" thread 1110 to complete. In this manner, the "perturbation" thread 1110 affects memory or processing time (or both).

Figure 12:
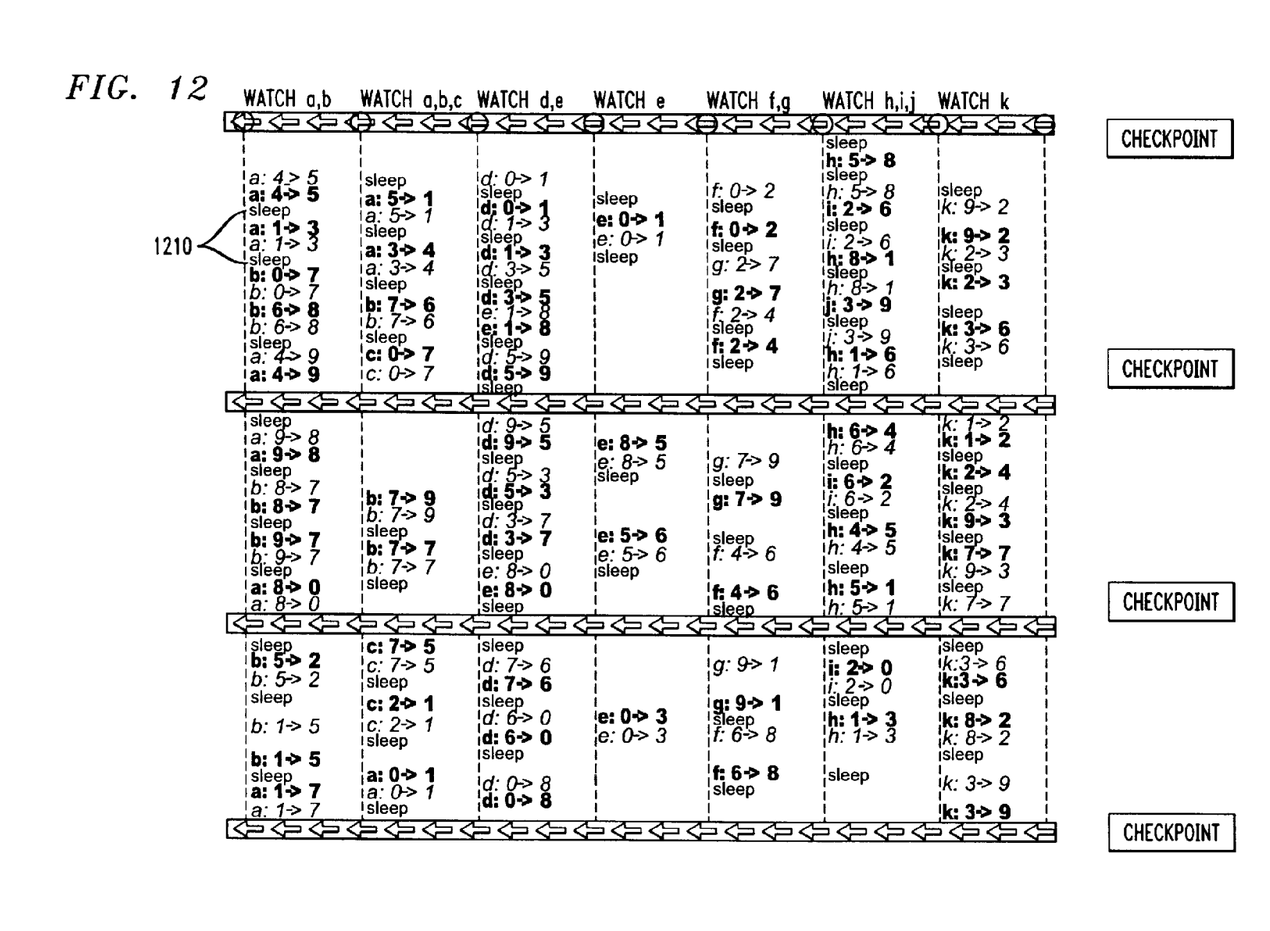
FIG. 12 illustrates a replay process according to a further embodiment of the present invention.

FIG. 12 illustrates a replay process according to a further embodiment of the present invention. As shown in FIG. 12, a user can optionally introduce random waits, such as sleep functions 1210, that introduce further variation into the replay execution.

Figure 13:
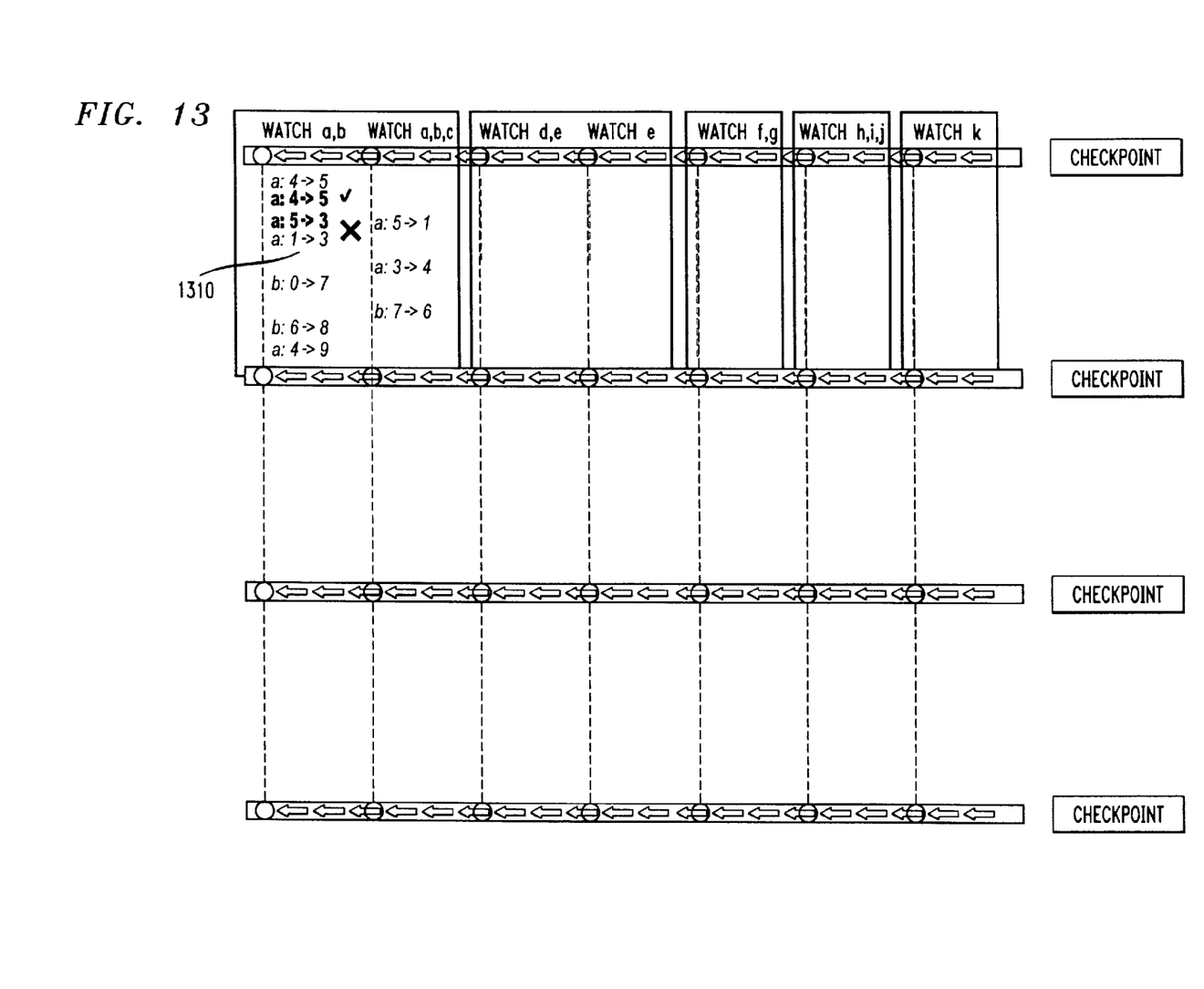
FIG. 13 illustrates a replay process according to yet another embodiment of the present invention.

FIG. 13 illustrates a replay process according to a partitioning embodiment of the present invention. If thread dependencies are known, the embodiment shown in FIG. 13 allows interdependent thread groups to be isolated into a partition, such as the partition 1310. In this manner, if there is a mismatch between observed and recorded executions, the user only needs to replay the partition having the failure. Each partition can be separately retried until a successful execution is encountered for the partition.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

What is claimed is:

1. A method for replaying a program, said method comprising the steps of:

recording for a given execution of said program:
one or more checkpoints of said program, said one or more checkpoints containing program state information; and
a recorded list of values for one or more identified variables executing in one or more threads of said program; and during a replay execution of said program:
commencing execution from a particular one of said recorded checkpoints;
restoring said program state information associated with said particular one of said recorded checkpoints;
comparing an observed list of values to said recorded list of values for said one or more identified variables executing in each of said one or more threads; and
identifying a difference between said observed list of values and said recorded list of values; and
restarting a replay at a previous successful checkpoint based upon an occurrence of said identification of said difference between said observed list of values and said recorded list of values.

2. The method of claim 1, wherein said observed list of values comprises an ordered list of value changes for each of said one or more identified variables executing in said one or more threads of said program.

3. The method of claim 1, wherein said observed list of values comprises before and after values for each value change for each of said one or more identified variables.

4. The method of claim 3, wherein said observed list of values comprises a time-stamp for each of said value changes.

5. The method of claim 1, wherein said recorded list of values for one or more identified variables is obtained for a determined set of recorded threads of said program and wherein said replay execution of said program comprises replaying said determined set of recorded threads.

6. The method of claim 1, wherein said comparing step is performed for each of said threads for each value change to compare before and after values for each value change.

7. The method of claim 1, wherein said identifying step further comprises the step of launching a debugging tool.

8. The method of claim 1, further comprising the step of introducing a perturbation or suspend statement into said replay execution of said program.

9. The method of claim 1, wherein a plurality of threads in said program are inter-dependent and said plurality of threads are partitioned into one or more partitions and said method further comprising the step of replaying program threads in each of said one or more partitions separately until a successful execution.

10. The method of claim 1, wherein said recorded list of values comprises a new value for said one or more identified variables following a value change.

11. A system for replaying a program, comprising:
a memory; and
at least one processor, coupled to the memory, operative to:
record for a given execution of said program:
one or more checkpoints of said program, said one or more checkpoints containing program state information; and
a recorded list of value changes for one or more identified variables executing in one or more threads of said program; and
during a replay execution of said program:
commence execution from a particular one of said recorded checkpoints;
restore said program state information associated with said particular one of said recorded checkpoints;
compare an observed list of values to said recorded list of values for said one or more identified variables executing in each of said one or more threads; and
identify a difference between said observed list of values and said recorded list of values; and
restart a replay at a previous successful checkpoint based upon an occurrence of said identification of said difference between said observed list of values and said recorded list of values.

12. The system of claim 11, wherein said observed list of values comprises an ordered list of value changes for each of said one or more identified variables executing in said one or more threads of said program.

13. The system of claim 11, wherein said observed list of values comprises before and after values for each value change for each of said one or more identified variables.

14. The system of claim 11, wherein said recorded list of values for one or more identified variables is obtained for a determined set of recorded threads of said program and wherein said replay execution of said program comprises replaying said determined set of recorded threads.

15. The system of claim 11, wherein said comparison is performed for each of said threads for each value change to compare before and after values for each value change.

16. The system of claim 11, wherein said processor is further configured to introduce a perturbation or suspend statement into said replay execution of said program.

17. The system of claim 11, wherein a plurality of threads in said program are interdependent and said plurality of threads are partitioned into one or more partitions and said processor is further configured to replay program threads in each of said one or more partitions separately until a successful execution.

18. The system of claim 11, wherein said recorded list of values comprises a new value for said one or more identified variables following a value change.

19. An article of manufacture for replaying a program, comprising a non-transitory computer readable recordable medium containing one or more other programs which when executed implement the steps of:
recording for a given execution of said program:
one or more checkpoints of said program, said one or more checkpoints containing program state information; and
a recorded list of values for one or more identified variables executing in one or more threads of said program; and
during a replay execution of said program:
commencing execution from a particular one of said recorded checkpoints;
restoring said program state information associated with said particular one of said recorded checkpoints;
comparing an observed list of values to said recorded list of values for said one or more identified variables executing in each of said one or more threads; and
identifying a difference between said observed list of values and said recorded list of values; and
restarting a replay at a previous successful checkpoint based upon an occurrence of said identification of said difference between said observed list of values and said recorded list of values.

20. The article of manufacture of claim 19, wherein said observed list of values comprises before and after values for each value change for each of said one or more identified variables.

* * * * *